United States Patent [19]

Lindenmaier

[11] 4,388,911
[45] Jun. 21, 1983

[54] APPARATUS FOR PRODUCING A DEFINED FUEL VAPOR-AIR MIXTURE FOR GASOLINE INTERNAL COMBUSTION ENGINES

[75] Inventor: Klaus Lindenmaier, Stuttgart, Fed. Rep. of Germany

[73] Assignee: Daimler-Benz Aktiengesellschaft, Stuttgart, Fed. Rep. of Germany

[21] Appl. No.: 216,482

[22] Filed: Dec. 15, 1980

[30] Foreign Application Priority Data

Dec. 13, 1979 [DE] Fed. Rep. of Germany ....... 2950126

[51] Int. Cl.³ .......................................... F02M 31/00
[52] U.S. Cl. .................... 123/557; 123/523; 261/144; 261/142
[58] Field of Search .................. 123/557, 522, 523; 261/144, 142, 145; 48/180 C, 180 H; 261/35, 72, 73

[56] References Cited

U.S. PATENT DOCUMENTS

| 853,653 | 5/1907 | Stewart | 261/144 |
| 920,231 | 5/1909 | White | 261/144 |
| 2,355,593 | 8/1944 | Aldrich | 123/557 |
| 2,860,228 | 11/1958 | Boyle | 261/142 |
| 2,982,528 | 5/1961 | Shelton | 261/142 |
| 2,988,075 | 6/1961 | Ensign | 123/557 |
| 4,092,963 | 6/1978 | Vrooman | 123/557 |

Primary Examiner—Ronald H. Lazarus
Attorney, Agent, or Firm—Craig & Burns

[57] ABSTRACT

An apparatus for producing a defined fuel vapor-air mixture for engines with an intake manifold. The apparatus including a float chamber and a vaporizing chamber accommodating a heated vaporizer surface. The intake manifold is provided with a first fixed restrictor or nozzle and a liquid space of the float chamber and a liquid space of the vaporizing chamber are connected with each other by a conduit. A gas space of the float chamber, as seen in a flow direction upstream of the first restrictor or nozzle, and a gas space of the vaporizing chamber as seen in a flow direction downstream of the restrictor or nozzle, are respectively connected to the intake manifold by means of conduits. A conduit from the gas space of the vaporizing chamber into the intake manifold is provided with a second fixed restrictor or nozzle causing a pressure drop of about 85%–99.99% of the first restrictor or nozzle. The vaporizer surface is arranged above the liquid level adjusted by the float chamber in such a way that the wetted vaporizer surface increases with a rinsing liquid level.

10 Claims, 1 Drawing Figure

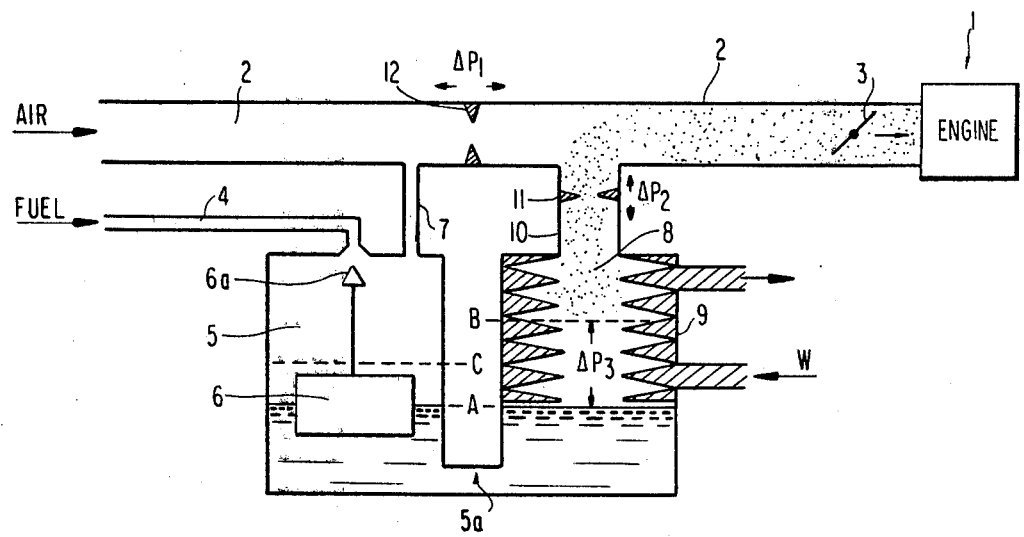

APPARATUS FOR PRODUCING A DEFINED FUEL VAPOR-AIR MIXTURE FOR GASOLINE INTERNAL COMBUSTION ENGINES

The present invention relates to a process and apparatus for producing a defined fuel vapor-air mixture for gasoline engines provided with an intake manifold, a float chamber, and a vaporizing chamber with a heated vaporizer surface.

In order to operate gasoline engines, fuel-air mixtures are required having an almost fixed fuel-air ratio over an entire operating range of the engine. With carburetors or injection systems, the mixture preparation yields essentially fuel droplet-air mixtures wherein only a small proportion of the fuel is present as a vapor in the intake manifold and the predominate amount of fuel vaporizes only in the cylinders during intake and compression strokes so as to form an ignitable mixture with the air. This dual-phase character of the mixture results in a portion of the fuel being precipitated on the walls of the intake manifold leading, on the one hand, to a non-uniform distribution of the fuel to the individual cylinders so as to provide differing air ratio values in the individual cylinders and, on the other hand, effecting strong fluctuations of the fuel-air ratio in non-stationary operation, for example, evaporation of the fuel from the intake manifold walls due to a vacuum during a deceleration of coasting operation.

In start-up or warm-up phases especially at low environmental temperatures, the amount of vapor produced from the low-boiling proportions of the normal fuel volume does not suffice for the formation of an ignitable mixture, i.e., the leanness limit. Consequently, the engine is inoperable unless additional measures are taken such as, for example, mixture enrichment, that is, an enriching of the fuel volume in the fuel-air mixture. However, these measures result in an increase in a proportion of undesirable components in the exhaust gas and also increase the fuel consumption of the engine. These problems also occur to an increasing degree with the use of alternative fuel such as, for example, methanol, which has a vapor pressure which, at low temperatures, is at such a low level that there is no way in which an ignitable mixture can be produced and, with such an alternative fuel, the engine must be started by, for example, a starting fuel and brought to a minimum temperature before being capable of being switched over to a methanol operation.

If the engine is operated with a single-phase homogeneous fuel-air mixture, substantial improvements can be expected not only in the uniform distribution of the fuel among the individual cylinders but also in the non-stationary behavior as well as the exhaust gas characteristics of the engine. For this purpose, to prepare the mixture, it is necessary to provide instead of a "gasifier", that is a carburetor, or an injection system, a device for producing a single-phase mixture of air in a genuine fuel vapor with a defined air ratio value is provided so as to enable, in an entire flow range, the vaporization of the fuel as well as the metering thereof.

While a number of methods and/or devices of the last mentioned type have been proposed, such devices can essentially be divided into two distinct types. More particularly, in a first type, the metering and mechanical atomization of fuel takes place in a conventional carburetor, with the fuel-air mixture then being heated up in a heat exchanger so as to vaporize the fuel. Since, in this construction, the proportion of air is also heated, the gaseous volume increases greatly thereby leading to an impaired filling of the cylinders and, thus, to a reduction in the maximum output of the engine.

A second type of proposed construction resides in the vaporizing of fuel in a boiler vessel, that is, a vaporizing chamber, with the vapor being metered by a gas mixer with a pressure regulator. This last mentioned construction essentially corresponds to constructions proposed for the operation of gas-operated engines. In German Offenlungsschrift No. 21 08 578, it is also proposed to introduce the fuel by way of a controlled nozzle onto a heating plate. However, a disadvantage of this process resides in the fact that fluctuations in the fuel-air ratio occur in situations of rapid flow changes during a non-stationary operation.

All of the system described hereinabove have one feature in common, as compared with carburetors or injection systems which heretofore have been used practically exclusively; namely, that such systems are very large or voluminous and are considerably expensive to manufacture.

The aim underlying the present invention essentially resides in providing a process and apparatus for enabling a production of a defined fuel vapor-air mixture having a large through flow range, with the apparatus being capable of being utilized in place of a normal carburetor.

In accordance with advantageous features of the process of the present invention, the fuel is vaporized on a heated vaporizing surface provided in a vaporizing chamber and the fuel vapor stream is mixed with an air stream. A vacuum pressure anaglous to the amount of air, is produced in the air stream with the vacuum correspondingly affecting the size of the effective vaporizer surface, and with vaporization taking place at a vacuum amounting to about 0.01%–40% of the vacuum produced in the air stream.

Advantageously, in accordance with the present invention, a vaporization of the fuel takes place at a vacuum amounting to about 0.5%–5% of the vacuum produced in the air stream and the vacuum affects a liquid level of the fuel in the vaporizing chamber.

In accordance with advantageous features of the apparatus of the present invention, the intake manifold of the engine is provided with a first fixed restrictor or nozzle with a liquid space of a float chamber and a liquid space of a vaporizing chamber being connected with a conduit. The gas space of the flow chamber, as viewed in a flow direction upstream of the restrictor or nozzle, and the gas space of the vaporizing chamber as viewed in a flow direction downstream of the restrictor or nozzle, are respectively connected to the intake manifold by means of conduits. A conduit from the gas space of the vaporizing chamber into the intake manifold is provided with a second fixed restrictor or nozzle causing a pressure drop of about 85% –99.99% of the first restrictor or nozzle. The vaporizer surface is arranged above the liquid level adjusted by the flow chamber in such a manner that the wetted vaporizer surface increases with a rising liquid level.

Advantageously, in accordance with further features of the present invention, the float chamber may be replaced by a level-regulated compensating chamber provided with a liquid overflow means.

Accordingly, it is an object of the present invention to provide a process and apparatus for producing a defined fuel vapor-air mixture for gasoline engines which avoids, by simple means, shortcomings and disadvantages encountered in the prior art.

Another object of the present invention resides in providing a process and apparatus for producing a defined fuel vapor - air mixture for gasoline engines which enables the operation of the engine without a normal carburetor.

Yet another object of the present invention resides in providing a process and apparatus for producing a defined fuel vapor - air mixture for gasoline engines which minimizes the occurrence of fluctuations in a fuel-air ratio of the mixture.

A still further object of the present invention resides in providing an apparatus for producing a defined fuel vapor - air mixture for gasoline engines which is simple in construction and therefore relatively inexpensive to manufacture.

Another object of the present invention resides in providing an apparatus for producing a defined fuel vapor - air mixture for gasoline engines which functions realiably under all functions realiably under all load conditions of the engine.

Another object of the present invention resides in providing an apparatus for producing a defined fuel vapor - air mixture for gasoline engines which is fully responsive to rapid load changes of the engine.

These and other objects, features, and advantages of the present invention will become more apparent from the following description when taken in connection with the accompanying drawings which show, for the purposes of illustration only, one embodiment in accordance with the present invention, and wherein:

The single FIGURE of the drawings is a schematic view of an apparatus for producing a defined fuel vapor - air mixture for gasoline engines in accordance with the present invention.

Referring now to the single FIGURE of the drawing, according to this FIGURE, air is fed to an engine generally designated by the reference numeral 1 through an intake manifold 2, in which is arranged a throttle valve 3 which in a conventional manner controls the output of the engine 1. Liquid fuel is conveyed by a fuel pump (not shown) through a conduit 4 to a float chamber 5. A float 6, with a feed valve 6a, is arranged in the float chamber 5 with the float being adapted to adjust a uniform fuel level, as in a normal carburetor through, for example, fuel flushing and backflow devices (not shown). A gas space of the float chamber 5 is connected to the intake manifold 2 through a pressure equalizing line 7 and a liquid space of the float chamber 5 is connected to a vaporizing chamber 8 by means of a lower, fuel-filled line 5a. The float chamber 5 and the vaporizing chamber 8 thus form communicating tubes wherein a fuel level A will rise to an identical level when the engine is at a standstill, which level is determined by the position of the float 6 and feed valve 6a.

A heat exchanging surface 9 is arranged in the vaporizing chamber 8 at a position disposed above the fuel level A and is maintained by a heat supply means (not shown) schematically illustrated by the reference character W, at a temperature above an upper boiling temperature of the fuel at a pressure of 1 bar. The gas space of the vaporizing chamber 8 is connected to the intake manifold 2 by way of a vapor line 10. A restrictor or baffle 11 is arranged in the vapor line 10 with a further restrictor or baffle being located in the intake manifold 2 between the inlets for the pressure equalizing line 7 and the vapor line 10.

When the engine is at a standstill, no pressure gradients occur at the restrictors or baffles 11, 12 so, as noted above, the same fuel level is obtained in the vaporizing chamber 8 as in the float chamber 5, which level is slightly below a lower edge of the heat exchange surfaces 9. The maintenance of the level of fuel at the fuel level A below the lower edge of the heat exchanger surfaces 9 ensures that, when the engine 1 is at a standstill, i.e., not running, no fuel is vaporized even if the heat exchange surfaces 9 are hot.

When the engine is running, the drawn in air produces a pressure gradient $\Delta p_1$ at the restrictor 12 in the intake manifold 2, with the gradient rising by the square with an increase or rising in the throughflow of the air. The pressure gradient $\Delta p_1$ acts through lines 7 and 10 on the fuel levels in the float chamber 5 and in the vaporizing chamber 8 so that, due to the lower pressure, the fuel in the vaporizing chamber 8 rises to a higher level B then the level in the float chamber 5 as determined by the position of the floats 6. For this purpose, a pressure differential $\Delta p_3$ is required.

As a result of the above measures, the heat exchange surfaces 9 are practically covered with liquid fuel which is vaporized thereon and flows a fuel vapor through the vapor line 10 provided with the restrictor 11 to the intake manifold 2 where it is admixed with the intake air. The higher the fuel level rises in the vaporizing chamber 8, the greater the amount of vaporizer surface of the heat exchange surfaces 9 so that more fuel is vaporized per unit of time. The fuel vapor stream produces a pressure gradient $\Delta p_2$ at the restrictor 11, which pressure gradient $\Delta p_2$ rises, analogously to the pressure gradient $\Delta p_1$, by the square with the fuel vapor throughflow. In total then the pressure difference $\Delta p_1$ at the restrictor 12 in the intake manifold must always be equal to the sum total of the pressure differences $\Delta p_2$ and $\Delta p_3$.

If steps are taken by means of the restrictor 11 to provide a vacuum in the gas space of the vaporizing chamber 8, which vacuum amounts to merely about 0.01%–40% and, preferably, about 0.5%–5%, of the vacuum ambient in the intake manifold 2 behind the restrictor 12, for example, the pressure in the intake manifold in front of the restrictor 12 is 1000 mbar (abs.), the vacuum produced behind the restrictor 12 is 100 mbar (i.e. the pressure absolute is 900 mbar), then the vacuum produced in the vaporizing chamber is 0.01 to 40 mbar which corresponds to 0.01 to 40% of the vacuum behind the restrictor 12 (i.e. the pressure absolute in the vaporizing chamber is 999.9 to 960 mbar), in this case, especially in a preferred range, $\Delta p_2$ becomes practically equal to $\Delta p_1$ and the amount of fuel flowing through the restrictor 11 becomes proportional to the amount of air flowing into the intake manifold 2. Thus, the desired fixed air ratio value of the fuel-air mixture is obtained even in situations of varying throughput or flow rate quantities over a large range of operation.

Moreover, at the same time, the interaction between $\Delta p_1$ and $\Delta p_2$ and the relatively small $\Delta p_3$ has the effect that the fuel level in the vaporizing chamber 8 and thus the heat exchange surface 9 covered by the fuel is in all cases adjusted so that, per unit of time, precisely that amount of fuel is vaporized which is required for replacing the amount of fuel vapor discharged per unit of time to the intake manifold 2, i.e., for keeping $\Delta p_2$ constant. Therefore, an automatic self-control of the vaporizing amount of fuel is attained whereby the system becomes independent of fluctuations of the operating parameters of the vaporizing chamber 8 as well as the temperature of the heating medium and thus the vaporizer temperature, the heat transfer value, as well as the throughput or flow rate.

Although the deviation of the mixture ratio for the air-fuel vapor mixture from an ideal mixture ration becomes somewhat smaller the closer the lower percentage limit of 0.01% is reached, the lower limit of 0.01% should not be exceeded in a downward direction since otherwise disproportionately low vaporizer surfaces on the heat exchanging surfaces 9 result as compared with the width of such surfaces. This would result, in situations of an oblique positioning or horizontal acceleration of the system, in extreme deviations of the air-fuel vapor mixture ratio. Additionally, an upper limit of 40% should not be exceeded because otherwise the mixture is made so lean that the perfect operation of the engine 1 is no longer ensured since in doing so the leanness running limit has been reached.

Under practical conditions, it is especially advantageous if the vacuum is in a range of about 0.5%–5% since, in this range, the fluctuations of the air ratio value remain below 2.5%, and the ratio of width to height of the vaporizer surfaces formed by the heat exchanging surfaces 9 ensures, for operation in motor vehicles, a sufficient insensitivity to the inclined positions of the horizontal accelerations of the motor vehicle. Therefore, with a normal operation of a motor vehicle in which the engine is installed, a fuel vapor-air mixture is obtained having a practically constant composition over a wide operating range of the engine.

If the fuel level in the vaporizing chamber 8 rises to too great a height due, for example, to a disturbance, that is, if too much fuel is vaporized because of an excessively large fuel-covered vaporizer surface, then the pressure should rise in the vaporizing chamber 8, that is, a greater amount of fuel vapor should be discharged through the restrictor 11. However, this would mean an increase in the $\Delta p_2$. Since the relatively small value of $\Delta p_3$ regulating the fuel level in the vaporizing chamber 8 is produced by a difference between $\Delta p_1$, fixedly predetermined by the amount of air flow, and $\Delta p_2$, $\Delta p_2$ can rise only at the cost of $\Delta p_3$. In other words, the fuel level is lowered with the reduction in the amount of fuel vaporized per unit of time. Since $\Delta p_3$ is very small as compared with $\Delta p_2$, even a substantial change in $\Delta p_3$ results merely in a small fluctuation of $\Delta p_2$. Conversely, if the fuel level in the vaporizing chamber 8 drops, due to a disturbance, then the decreasing vapor stream effects a small reduction in the value of $\Delta p_2$ which cause, due to an unchanged $\Delta p_1$, a large increase in the value of $\Delta p_3$, i.e., a compensating rise in the fuel level and thus in the vaporizing amount of fuel.

With rapid load changes of the engine 1, that is rapid changes in the amount of air flowing through the intake manifold 2, the system can likewise follow rapidly due to the above noted regulating effect since the float chamber 5, communicating with the vaporizing chamber 8, acts as a compensating vessel. Therefore, the fuel filled line 5a forming the connection between the float chamber 5 and the vaporizing chamber 8 must have a sufficiently large cross section so as to ensure a rapid equalization of the fuel quantities. If for example the air throughflow decreases rapidly then, due to the decreasing value of the pressure $\Delta p_3$, fuel will flow from the vaporizing chamber 8 into the float chamber 5 and the fuel level in the float chamber 5 will rise briefly above the level a to, for example, the level C. By selecting a suitable size ratio between the float chamber 5 and the vaporizing chamber 8, the effect can be achieved that a change in the liquid level in the vaporizing chamber 8 brings about only a minor change in the liquid level of the float chamber 5. Thus, it can be ensured that, when the engine 1 is turned off, even with hot vaporizing surfaces, no fuel vaporizes in as much as the fuel receeding from the level B in the vaporizing chamber after the engine is turned off will only cause such a small total level increase in the communicating system of the float chamber 5 and vaporizing chamber 8 that the liquid level no longer contacts the vaporizing surfaces formed by the heat exchanger surfaces 9.

The heating of the heating surfaces 9 may take place by means of, for example, hot exhaust or waste heat generated by the engine during a running operation. Depending on the boiling point of the fuel, for example, gasoline, or alternative fuel such as, for example, methanol, the heating of the heating surfaces may be carried out with warm engine coolant or with exhaust gas and, optionally, with the interposition of a heat pipe.

If the heat is supplied to the heating surfaces 9 from the exhaust gases of the engine, then the heat exchange surfaces 9 may be constructed with a small heat capacity. In this manner, it may be possible under certain circumstances to electrically heat the heat exchanger prior to starting the engine 1 so as to enable the bringing of the heat exchange surfaces 9 to a desired operating temperature. If after reaching the operating temperature, the engine 1 is started, with the aid of a starter, then the vaporizing chamber 8 delivers fuel vapor immediately. Consequently, the engine 1 may be supplied with a fuel vapor-air mixture even during a starting process. As soon as the engine fires, the exhaust gases of the engine 1 will take over the supplying of vaporizing heat to the heat exchange surfaces 9 so that the electrical heater can then be turned off even while the engine is still warming up.

Instead of a restrictor 12 installed in the intake manifold 2 and a restrictor 11 installed in a connecting conduit 10 between the intake manifold 2 and the gas space of the vaporizing chamber 8, other elements may likewise be employed which produce a defined pressure differential in dependence upon the throughflow of air. For example, nozzles or the like may be employed. Of course, the elements installed in the intake manifold 2 and the connecting conduit 10 which are to function as the restrictors 11, 12 must have the same dependency on the throughflow since otherwise, with a varying throughflow, there will now be a fuel vapor - air mixture of a constant composition.

The size and/or temperature of the heating surfaces 9 are dimensioned so that the fuel can be vaporized at the level to which the fuel has risen in the vaporizing chamber 8 due to the vacuum ambient in the intake manifold 2 while maintaining the pressure conditions for the gas space of the vaporizing chamber 8. Since the heat of evaporation of the fuels is known and/or can be readily measured, the constructing of the heating surfaces 9 with regard to size and temperature can readily be carried out with no difficulties.

Furthermore, by a suitable configuration of the vaporizing chamber 8, for example, by providing a downwardly hemispherical outline of the vaporizing surfaces formed by the heat exchanging surfaces 9 extending above into a likewise hemispherical vaporizing chamber 8, it is possible to counteract irregularities which may occur during an operation of a motor vehicle due to acceleration and deceleration or even irregularities caused by the operating of the motor vehicle on uneven terrain.

Additionally, it is advantageous to keep the liquid volume small in a region of the heat exchanging surfaces 9 to maintain delay phenomena during load changes of the engine 1 at a minimum, caused by the heating of large amounts of liquid.

While it is not absolutely necessary to vent the float chamber 5 by way of the conduits 7 to the intake manifold 2, the venting of the float chamber 5 into the intake manifold 2 has the advantage, as compared with venting into the atmosphere, which would also actually be feasible, that the minor vacuum, existing behind an air filter in the intake system of the engine and varying in dependence upon the filter material and degree of contamination of the filter, is automatically taken into account during the production of the air - fuel vapor mixture.

It is possible to variably adjust the cross section of one or both of the restrictors 11, 12 or corresponding nozzles so that the overall system would then become suitable for use in conjunction with a λ-probe. If the cross section of the restrictors 11 and/or 12 is varied by a regulating unit controlled by the λ-probe it is possible to attain a stoichiometric mixture in all cases.

Furthermore, the apparatus of the present invention may be operated in conjunction with a gas generator, an intake air heater or a flame starting unit. In this connection, it is possible to take the heat required for heating and vaporizing the fuel from the hot cracked gas of the gas generator or from the hot exhaust gas of the intake air heater and to thus cover the energy balance of the entire apparatus as early as during a start-up phase of the engine 1.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An apparatus for producing a defined fuel vapor-air mixture for an internal combustion engine which includes an intake manifold means for supplying intake air to the engine, the apparatus comprising a chamber means for accommodating a liquid fuel, and a vaporizer chamber having a heated means for vaporizing the liquid fuel, each of the chamber means and vaporizer chamber have a gas space and a liquid space, first means are provided for communicating the liquid spaces of the chamber means and vaporizer chamber to each other, second means are arranged in the intake manifold for restricting a flow of intake air and causing a pressure gradient, third means are provided for communicating the gas space of the vaporizer chamber with the intake means at a position downstream of the second means as viewed in a flow direction, the pressure gradient caused by the second means being effective by way of said third means to control a level of liquid fuel in the vaporizer chamber, fourth means are disposed in the third means for providing a vacuum in the gas space of the vaporizer chamber such that a vacuum pressure in the gas space of the vaporizer chamber is about 0.01–40% of a vacuum pressure ambient in the intake manifold means at a position downstream of the second means, and the heated means includes at least one vaporizer surface arranged in the vaporizer chamber in such a manner that an area of the vaporizer surface wetted by the liquid fuel increases as a level of liquid fuel in the vaporizer chamber rises.

2. The apparatus according to claim 1, wherein the second and fourth means are constructed as fixed restrictor means.

3. The apparatus according to claim 1, wherein the second and fourth means are constructed as fixed nozzle means.

4. The apparatus according to claims 1, 2, or 3, wherein a fifth means is provided for communicating the gas space of the chamber means with the intake manifold means at a position upstream of the second means, as viewed in a flow direction of the intake air.

5. The apparatus according to claim 1, wherein the chamber means is a float chamber accommodating therein a float operated valve means.

6. The apparatus according to claim 5, wherein the vacuum pressure in the gas space of the vaporizer chamber is about 85%–99.99% of the pressure ambient in the intake manifold means.

7. The apparatus according to claim 1, wherein the vacuum pressure in the gas space of the vaporizer chamber is about 95%–99.5% of the pressure ambient in the intake manifold means.

8. The apparatus according to claims 1, 2, or 3, wherein means are provided for venting the gas space of the chamber means to the atmosphere.

9. The apparatus according to claims 1, 2, or 3, wherein the at least one vaporizer surface is arranged in the vaporizer chamber so that a lower edge of the vaporizer surface is disposed above a level of the liquid fuel in the vaporizer chamber when the engine is not running.

10. The apparatus according to claims 1, 2, or 3, wherein in that the chamber means is a level regulated compensating chamber provided with liquid overflow means.

* * * * *